(12) United States Patent
Hayakawa et al.

(10) Patent No.: US 8,251,554 B2
(45) Date of Patent: Aug. 28, 2012

(54) LIGHTING APPARATUS FOR MOTORCYCLE

(75) Inventors: Koshi Hayakawa, Wako (JP); Mutsumi Katayama, Wako (JP); Jun Morimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 337 days.

(21) Appl. No.: 12/270,639

(22) Filed: Nov. 13, 2008

(65) Prior Publication Data

US 2009/0141509 A1   Jun. 4, 2009

(30) Foreign Application Priority Data

Nov. 29, 2007 (JP) ................................. 2007-308727

(51) Int. Cl.
*F21V 33/00* (2006.01)
(52) U.S. Cl. .................... 362/473; 362/540; 362/545
(58) Field of Classification Search .................. 362/549, 362/190, 220, 285, 362, 364, 375, 459, 473–476, 362/548, 540, 543–546
See application file for complete search history.

(56) References Cited

U.S. PATENT DOCUMENTS

| | | | | | |
|---|---|---|---|---|---|
| 4,538,217 | A | * | 8/1985 | Ewing et al. | 362/375 |
| 4,632,415 | A | * | 12/1986 | San Hai | 280/279 |
| 4,686,656 | A | * | 8/1987 | Morishima | 362/473 |
| 5,345,369 | A | * | 9/1994 | Ruud et al. | 362/145 |
| 5,820,254 | A | * | 10/1998 | Duenas | 362/473 |
| 6,158,279 | A | * | 12/2000 | Saiki | 73/493 |
| 6,203,182 | B1 | * | 3/2001 | Hasegawa et al. | 362/547 |
| 6,267,401 | B1 | * | 7/2001 | De Jong | 280/287 |
| 6,464,379 | B1 | * | 10/2002 | Mc Kenna | 362/473 |
| 6,550,945 | B2 | * | 4/2003 | Chiu | 362/473 |
| 6,592,242 | B1 | * | 7/2003 | Scaccia | 362/473 |
| 6,802,632 | B2 | * | 10/2004 | Kajitori et al. | 362/473 |
| 6,808,298 | B2 | * | 10/2004 | Christensen | 362/473 |
| 6,814,477 | B2 | * | 11/2004 | Yamaguchi et al. | 362/497 |
| 6,863,425 | B2 | * | 3/2005 | Hatfield, Jr. | 362/473 |
| RE39,417 | E | * | 12/2006 | Barry | 362/473 |
| 7,264,076 | B2 | * | 9/2007 | Grigg et al. | 180/219 |
| 7,281,831 | B2 | * | 10/2007 | Kouchi et al. | 362/540 |
| 7,578,608 | B2 | * | 8/2009 | Albou | 362/509 |
| 2003/0067781 | A1 | * | 4/2003 | Kajitori et al. | 362/473 |
| 2003/0141696 | A1 | * | 7/2003 | Chao | 280/287 |

(Continued)

FOREIGN PATENT DOCUMENTS

| | | |
|---|---|---|
| JP | 2001-334976 A | 12/2001 |
| JP | 2003-300488 A | 10/2003 |

*Primary Examiner* — Hargobind S Sawhney
(74) *Attorney, Agent, or Firm* — Westerman, Hattori, Daniels & Adrian, LLP (57) ABSTRACT

A lighting apparatus has a housing and is disposed at a lower end of a front fork of a motorcycle. The housing includes a front opening disposed on a side of a radiation direction of a lighting body and a side opening disposed on a center side in a width direction of a motorcycle. The side opening in the housing, covered by a lid, is wide enough for the lighting body to pass through. The housing includes a wire guide for withdrawing an electric wire and a drain hole formed in a bottom portion of the housing. The lighting body is fixed on a board. The housing includes rails disposed on an upper wall portion and a lower wall portion thereof, into which an upper end and a lower end of the board are to be fitted so as to position the lighting body in a longitudinal direction.

6 Claims, 9 Drawing Sheets

U.S. PATENT DOCUMENTS

2004/0145897 A1* 7/2004 Felty ............................ 362/473
2005/0174787 A1* 8/2005 Uemoto et al. ............... 362/473
2006/0092659 A1* 5/2006 Bynum ........................ 362/549
2006/0171154 A1* 8/2006 Nishimoto ................... 362/473

* cited by examiner

LIGHTING APPARATUS FOR MOTORCYCLE

TECHNICAL FIELD

The present invention relates generally to lighting apparatuses for a motorcycle, in particular, a lighting apparatus disposed to improve visibility of a third person.

BACKGROUND OF THE INVENTION

Japanese Patent Laid-Open No. 2001-334976 (hereinafter, "JP '976") discloses a motorcycle with a lamp unit for visibility purpose such that pedestrians and vehicle drivers can more readily recognize the presence of the motorcycle. However, because motorcycles are typically smaller than passenger cars and trucks, the visibility of the motorcycle to a third party is often reduced, making it likely that the third party will misjudge the distance and speed of the oncoming motorcycle.

Japanese Patent Laid-Open No. 2003-300488 (hereinafter, "JP '488) discloses a motorcycle in which at least one of lighting bodies of a lighting body system of a motorcycle is disposed at a level equal to, or lower than, an axle and forward of a rearmost portion of a front wheel or rearward of a frontmost portion of a rear wheel.

In particular, JP '488 discloses a motorcycle having a structure, in which the lighting apparatus is disposed downwardly. This structure produces an effect of making the lighting apparatus more noticeable. When disposing the lighting apparatus downwardly of the axle, the lighting apparatus may specifically be disposed at a lower end of a front fork. However, the lower end of the front fork is close to the axle and is therefore susceptible to vibrations of wheels occurring from road surface irregularities as the motorcycle runs. Thus, there is a need for a structure for rigidly mounting the lighting apparatus on the front fork, regardless of vibrations of the front fork. In addition, the lighting apparatus is readily noticeable from the standpoint of appearance. There is therefore another need for a mounting structure that does not degrade an aesthetic value of the appearance.

Accordingly, one objective of the present invention is to provide a motorcycle with a lighting apparatus that is more noticeable to third persons and is reliably mounted on a front fork structure of the motorcycle.

SUMMARY OF THE INVENTION

To achieve the foregoing objective, according to a first aspect of the present invention, there is provided a lighting apparatus for a motorcycle disposed at a lower end of a front fork supporting a front wheel via a bearing portion. The lighting apparatus includes a lighting body and a housing accommodating the lighting body. The housing includes a housing main body and a lid. Specifically, the housing main body has a front opening disposed on a side of a radiation direction of the lighting body and a side opening disposed on a center side in a width direction of the motorcycle. The lid covers the side opening. The side opening is wide enough for the lighting body to pass through.

In accordance with the first aspect of the present invention, surfaces of the housing and the lid in abutment with each other, specifically, a division surface between the two elements is disposed on the center side of the vehicle body, specifically, a spot that is hard to view from an outside. This makes for good appearance. In addition, the lighting body can be installed only by way of a side of the housing through the side opening. This ensures good workability.

According to a second aspect of the present invention, the housing further includes a wire guide, a wall member, and a drain hole. Specifically, the wire guide is for withdrawing an electric wire for the lighting body into the housing from an upward direction. The wall member guides the electric wire withdrawn into the housing downwardly of the lighting body. The drain hole is formed in a bottom portion of the housing.

In accordance with the second aspect of the present invention, the wire can be wired inside the housing. This improves appearance with no wires exposed on an outer periphery of the housing. Should water enter from an upper portion along the wire, the wire is guided downwardly of the lighting body and then folded back upwardly. There is therefore no chance of the lighting body being splashed with water. Further, the water, should it enter the housing, is discharged through the drain hole.

According to a third aspect of the present invention, the lighting body is fixed on a board and the housing includes rails disposed on an upper wall portion and a lower wall portion thereof, into which an upper end and a lower end of the board are to be fitted so as to position the lighting body in a longitudinal direction of the lighting apparatus.

In accordance with the third aspect of the present invention, the lighting body can be positioned by being guided along the rails inside the housing. This allows the lighting body to be installed at a predetermined position inside the housing easily.

According to a fourth aspect of the present invention, the board includes a bracket provided in a standing condition. The bracket is screwed to the housing.

In accordance with the fourth aspect of the present invention, the board, the position of which is restricted by the upper and lower rails, is further screwed in position. This structure and arrangement more reliably secures the lighting body to the housing.

BRIEF DESCRIPTION OF THE DRAWINGS

A preferred embodiment of the present invention will be described with reference to the accompanying drawings, wherein.

DETAILED DESCRIPTION OF THE INVENTION

Figure 1:
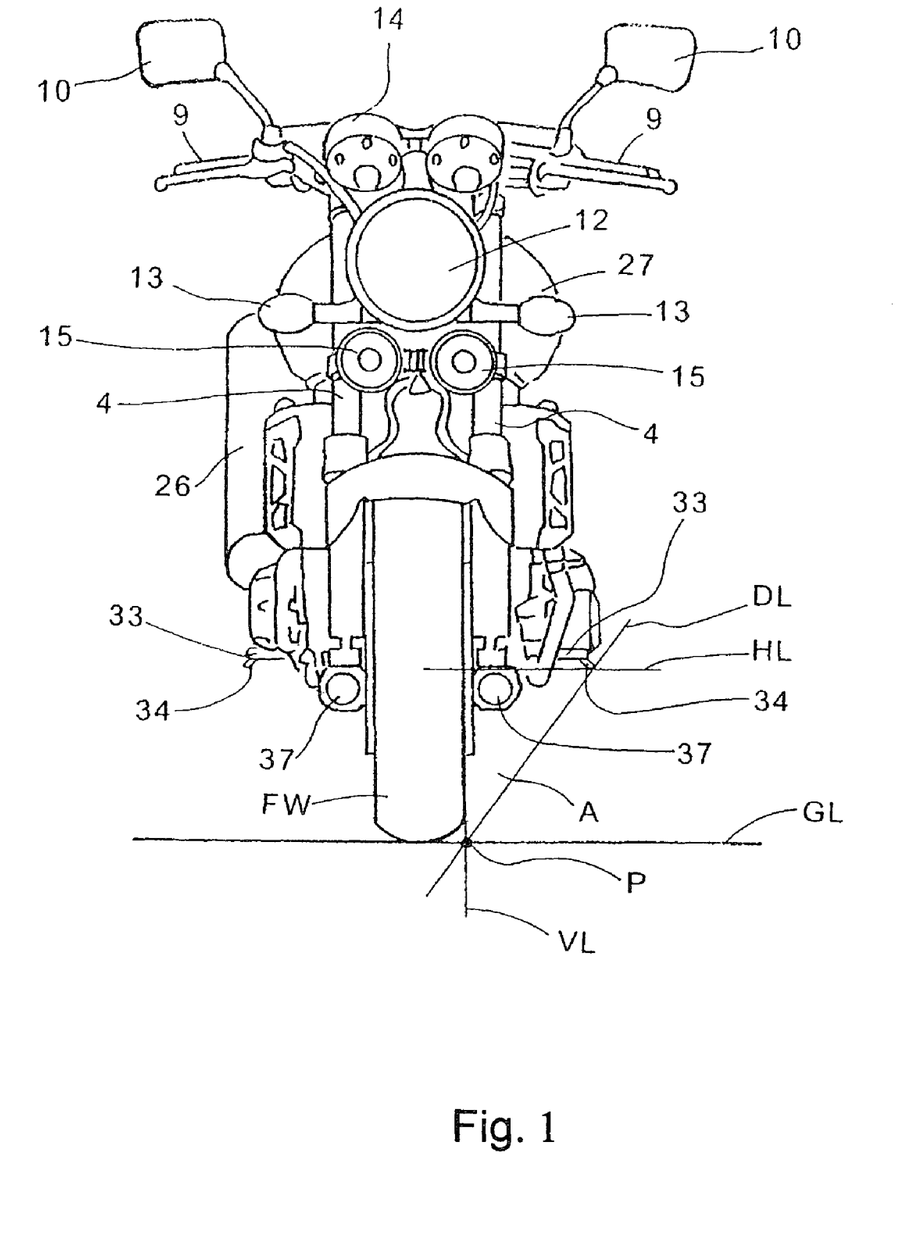
FIG. 1 is a front view showing a motorcycle according to the present invention.
Figure 2:
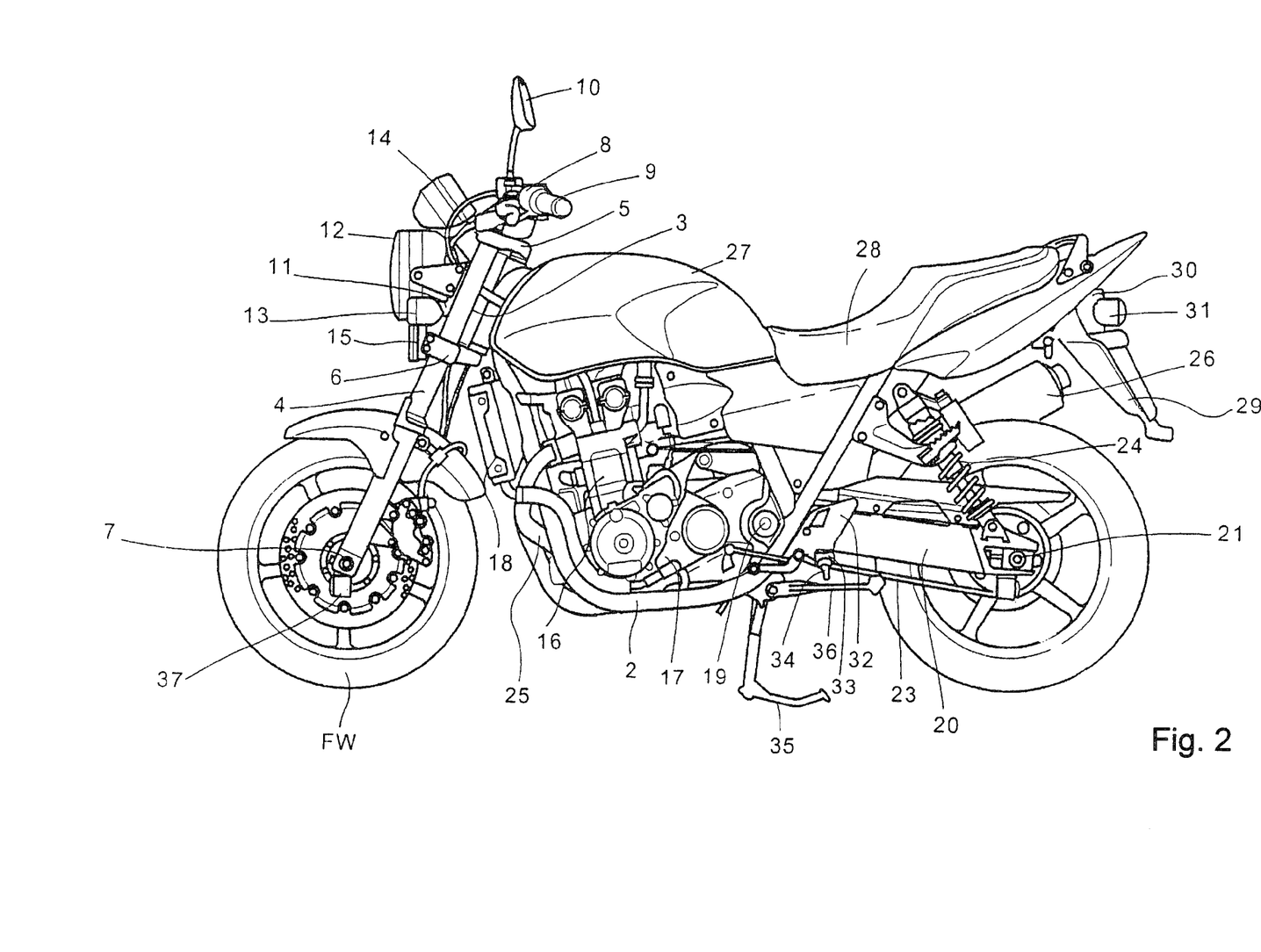
FIG. 2 is a left side elevation view showing the motorcycle according to the present invention.

A specific embodiment to which the present invention is applied will be described below with reference to the accompanying drawings. FIG. 1 is a front view showing a motorcycle according to a first embodiment of the present invention. FIG. 2 is a left side elevation view of the motorcycle. A motorcycle 1 includes a frame body 2 composed of a pair of left and right pipe frames. A head pipe 3 joined to a front portion of the frame body 2 rotatably supports a steering stem not shown. The steering stem has upper and lower portions connected to a top bridge 5 and a bottom bridge 6, respectively, of a front fork 4. The front fork 4 is extended downwardly so as to support a front wheel FW via a front wheel axle 7 disposed near a lower end of the front fork 4.

A handlebar pipe 8 is connected to the top bridge 5. The handlebar pipe 8 is mounted with a grip 9 and a mirror 10. A bracket 11 is joined to the front fork 4. The bracket 11 is mounted with a headlamp 12, a front turn signal lamp 13, and a meter 14. The bottom bridge 6 is attached with a horn 15.

An engine 16 is mounted on the frame body 2. A transmission 17 is disposed downwardly of, and a radiator 18 is disposed forwardly of, the engine 16. A swing arm 20 is swingably supported by a shaft 19 disposed substantially at a center of the frame body 2. The swing arm 20 has an end that rotatably supports a rear wheel RW via a rear wheel axle 21. A drive chain 23 is trained over an output shaft (not shown) of the transmission 17 and over the rear wheel axle 21. A rear suspension 24 has an upper end connected to a rear portion of the frame body 2 and a lower end connected to a rear end of the swing arm 20. An exhaust pipe 25 disposed at a front portion of the engine 16 is extended rearward of a vehicle body. A muffler 26 is attached to an end of the extension.

A fuel tank 27 is disposed at an upper portion of the frame body 2. A rider seat 28 is disposed rearward of the fuel tank 27. A mud guard 29, a tail/brake light 30, and a rear turn signal lamp 31 are disposed at the rearmost portion of the frame body 2.

A bracket 32 is joined rearward of the shaft 19 of the swing arm 20. A step (footrest for the rider) 33 that protrudes outwardly in a vehicle width direction is mounted on the bracket 32. The step 33 includes a protrusion 34 disposed on a lower side of a distal end thereof. The protrusion 34 functions as a back-up sensor. The step 33 is elastically mounted on the bracket 32 via a spring. When the protrusion 34 contacts a ground, therefore, the step 33 is pushed upwardly to absorb shock of grounding. When a bank angle is made small, the step 33 is returned to its original position through the action of the spring. Impact absorbing structures of such a step are well known and detailed descriptions thereof will be omitted. A main stand 35 and a side stand 36 are mounted on a lower portion of the frame body 2.

The motorcycle 1 according to this embodiment of the present invention includes the headlamp 12, the front turn signal lamp 13, the rear turn signal lamp 31, and the tail/brake light 30. In addition to these, the motorcycle 1 also includes a lighting apparatus 37 for improving visibility of a third person. The lighting apparatus 37 is disposed on each of left and right sides of the front fork 4 at a lower end thereof. The lighting apparatus 37 is oriented toward the direction of travel of the motorcycle 1.

A lighting apparatus 38 may also be disposed at a lower portion in rear of the swing arm 20 to improve visibility from a rearward direction. It is preferable that both the lighting apparatus 37 and the lighting apparatus 38 be provided; however, it is only necessary that at least the lighting apparatus 37 be provided. A lighting body, specifically a lighting portion main body, of the lighting apparatus 37, 38 may be a light bulb. It is, however, preferable that one light emitting diode or an assembly of a plurality of light emitting diodes (the plurality of light emitting diodes disposed in a circular, rectangular, or any other form) be used. This is because the foregoing arrangement makes a power-saving, high-illuminance lighting body. Preferably, the lighting apparatus 37, 38 is adapted to be lit even when the motorcycle 1 remains stationary, as long as the engine 16 of the motorcycle 1 is running.

Providing the motorcycle 1 with a lighting apparatus on the underside of the vehicle body as described above helps improve visibility of the third person.

Not only on the front fork 4 and the swing arm 20, but the lighting apparatus 37, 38 may also be disposed toward either the front or rear side. The lighting apparatus 37, 38 is disposed at the lower portion of the vehicle body specifically defined as follows in a front view of the motorcycle 1, specifically, in a condition shown in FIG. 1.

Specifically, referring to FIG. 1, the lighting apparatus 37, 38 is disposed in a range A that is enclosed by a horizontal line HL, a vertical line VL, and a straight line DL. The horizontal line HL passes through the distal end of the protrusion 34 of the step 33. The vertical line VL passes through either side surface of the front wheel FW. The straight line DL connects a point P, at which the vertical line VL and a ground contact surface GL when the front wheel FW is in an upright position intersect, with the distal end of the protrusion 34. The front wheel FW herein refers specifically to a rubber tire portion.

The protrusion 34 is selected as an element that defines the horizontal line HL and the straight line DL forming part of the range A. The protrusion 34 is, however, not the only element to be selected. The protrusion 34 is a portion that contacts the ground first when the motorcycle 1 is banked, specifically, the first grounding portion. Depending on the type or kind of the motorcycle, therefore, a structure may have a cowl, an engine case, a muffler, or the like that contacts the ground first during banking before the step. In such a structure, any of the above-referenced parts serves as the first grounding portion, instead of the protrusion 34, and is selected as the element defining the horizontal line HL and the straight line DL forming part of the range A.

The embodiment of the present invention described above assumes the step, the cowl, or the like as the first grounding portion during banking. If the present invention is applied to a scooter type motorcycle, a grounding end (an end that is in contact with the ground when in use) of a center stand can be the first grounding portion. When not in use, or when the motorcycle is running, the center stand is pivoted up to its non-deployed position to a level higher than the cowl having the step. Accordingly, in the scooter type motorcycle, the grounding end of the center stand is preferably set as the first grounding portion to define the range A.

In the embodiment of the present invention described above, the lighting apparatuses 37, 38 are disposed at the lower end of the front fork 4 and the lower end in the rear of the swing arm 20 supporting the axle of the rear wheel RW, respectively. The present invention is not limited to the foregoing arrangement; rather, the lighting apparatus may be disposed only at either the lower end of the front fork 4 or the lower end in the rear of the swing arm 20.

Figure 3:
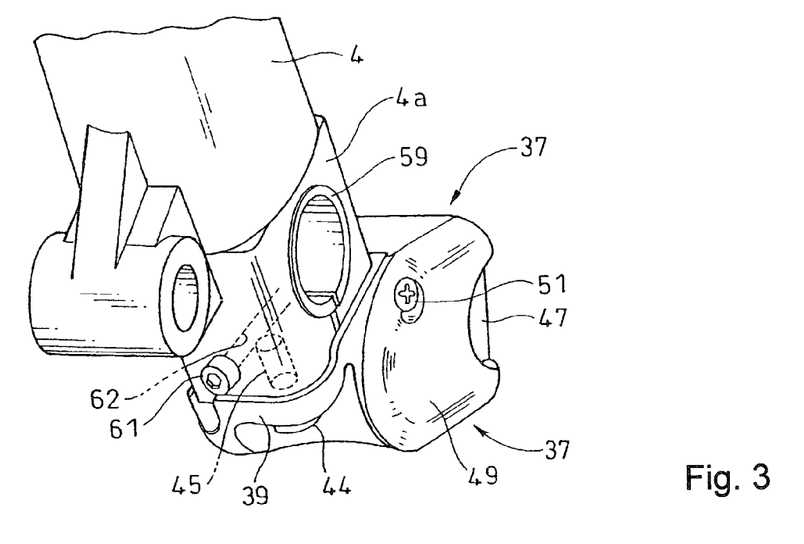
FIG. 3 is a rear perspective view showing a lighting apparatus disposed in the motorcycle according to the present invention.
Figure 4:
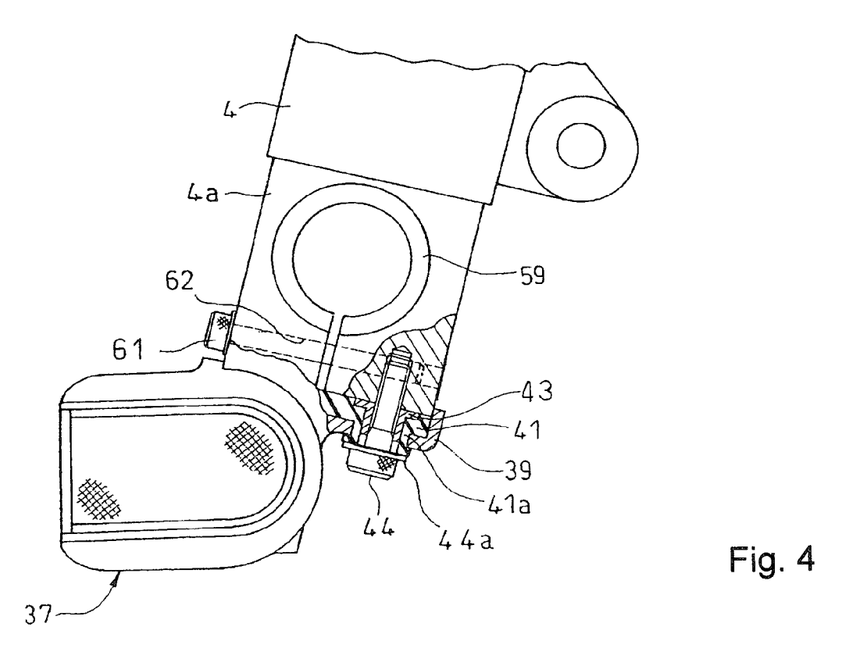
FIG. 4 is a side elevation view showing the lighting apparatus disposed in the motorcycle according to the present invention.
Figure 5:
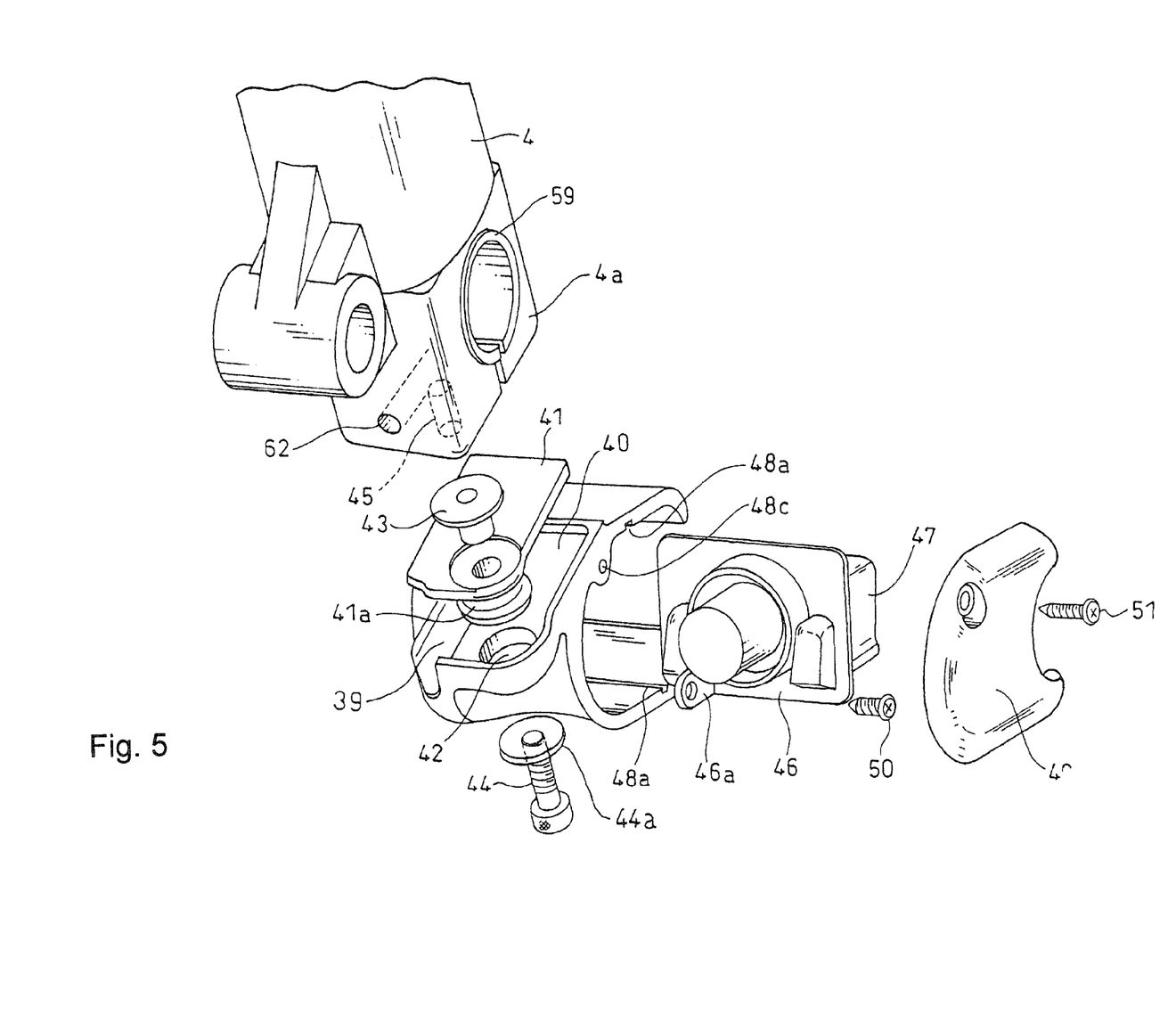
FIG. 5 is an exploded perspective view showing the lighting apparatus disposed in the motorcycle according to the present invention.

FIG. 3 is a rear perspective view showing a left front fork mounted at the lighting apparatus 37. FIG. 4 is a side elevation view showing the left front fork. FIG. 5 is an exploded perspective view showing the left front fork. Referring to FIG. 3 through 5, the lower portion of the front fork 4, specifically, a bottom case 4a is formed substantially into a rectangular parallelepiped, constituting a bearing for supporting the front wheel axle 7. The lighting apparatus 37 is coupled to a lower end surface of the bottom case 4a. The lighting apparatus 37 has a mounting portion 39 at an upper surface thereof for mounting the bottom case 4a. The mounting portion 39 includes a bottom case receiving surface 40 having a dish shape that matches the shape of the lower end of the bottom case 4a. A substantially rectangular rubber sheet (vibration isolation sheet) 41 is disposed between the bottom case receiving surface 40 and the lower end surface of the bottom case 4a. The mounting portion 39 has a hole 42 formed therein. A columnar portion 41a formed at a corner of the rubber sheet 41 fits into the hole 42. The columnar portion 41a has a flange overhanging a lower surface of the mounting portion 39, so that the rubber sheet 41 is held in the mounting portion 39.

The columnar portion 41a of the rubber sheet 41 has a bolt through hole formed therein. A collar 43 is inserted into the bolt through hole from an upper side of the rubber sheet 41. A bolt 44 is inserted by way of a washer 44a from the lower surface of the mounting portion 39. The bolt 44 then extends upwardly through the collar 43, being threaded into a threaded hole 45 formed in the bottom case 4a. The threaded hole 45 is bored at a position, at which the threaded hole 45 does not interfere with a bolt hole 62, through which a pinch bolt 61 for fixing the axle (not shown) of the front wheel FW supported on the bearing by being tightened onto the bottom case 4a.

As such, the lighting apparatus 37 and the bottom case 4a are connected together by the bolt 44 in a condition, in which the lower end having a generally rectangular cross section of the bottom case 4a fitted into the bottom case receiving surface 40 of the mounting portion 39 of the lighting apparatus 37. Accordingly, the lighting apparatus 37 can be firmly fixed relative to the bottom case 4a with the only one bolt 44.

The rubber sheet 41 interposed between the bottom case 4a and the bottom case receiving surface 40 helps prevent (or reduce) vibrations of the front fork 4 from being directly transmitted to the lighting apparatus 37. The bolt 44 may be bonded to the bottom case 4a with adhesive or provided with a bolt cap or the like.

The lighting apparatus 37 includes a lighting body 47 mounted on a board 46, a housing 48 accommodating the lighting body 47, and a lid 49 of the housing 48. The housing 48 has a surface open in front of the lighting apparatus 37 (in the direction of light radiation) with a first side (outboard side of the motorcycle, specifically, the left side for the left front fork and the right side for the right front fork) closed. In addition, the housing 48 has a bottom portion and an upper portion, each having a guide groove or rail 48a, 48a formed therein. The rail 48a is adapted to allow the lighting body 47 to be positioned longitudinally inside the housing 48. The board 46 includes a bracket 46a provided in a standing condition. The bracket 46a is positioned so as to oppose a seat (to be described later) formed on the first side of the housing 48.

Figure 6:
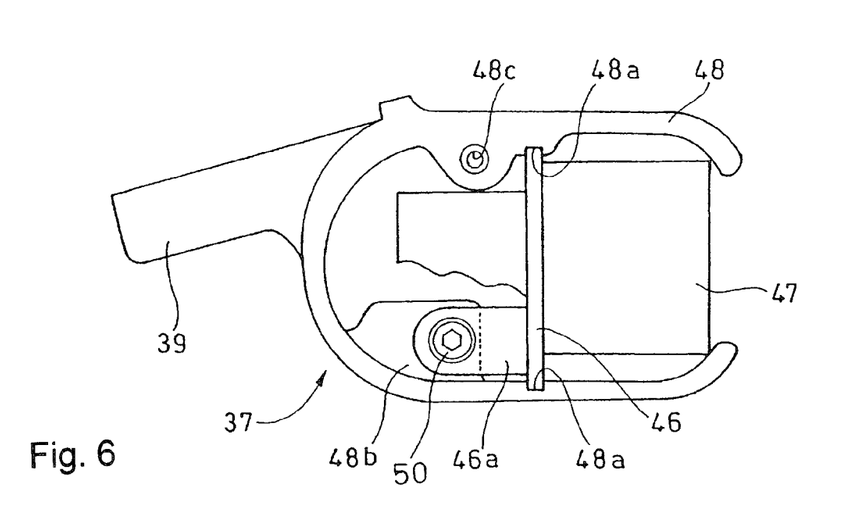
FIG. 6 is an open side elevation view of a housing of the lighting apparatus disposed in the motorcycle according to the present invention.

FIG. 6 is a side elevation view of the lighting apparatus 37, showing the board 46 engaged to the housing 48. The housing 48 includes on an inside thereof a seat 48b and the rails 48a, 48a that hold upper and lower ends of the board 46, on which the lighting body 47 is mounted, so as to position longitudinally the lighting body 47. With the upper and lower ends of the board 46 fitted in the rails 48a, 48a, the bracket 46a is made to oppose the seat 48b and a set screw 50 is passed through the bracket 46a and threaded into a threaded hole in the seat 48b, so that the board 46 can be secured to the housing 48.

An example of procedures for assembling the lighting apparatus 37 having the above-described arrangements into the front fork 4 will be described below.

First, the lighting apparatus 37 is assembled together. The lighting body 47 is placed into the housing 48 by way of the opening on the side of the housing 48. Guiding the upper and lower ends of the board 46 along the rails 48a, 48a, push the board 46 all the way in. With the bracket 46a in abutment on the seat 48b, the set screw 50 is threaded into the seat 48b. With the lighting body 47 fixed inside the housing 48 as described above, the lid 49 is placed over the opening in the side of the housing 48 and then a set screw 51 is threaded into a threaded hole 48c in the housing 48. It is even more preferable if the board 46 is bonded to the housing 48 to achieve an even solid fixing of the lighting body 47 in the housing 48.

The assembled lighting apparatus 37 is next mounted on the bottom case 4a of the front fork 4. The rubber sheet 41 is first placed on the bottom case receiving surface 40. The columnar portion 41a of the rubber sheet 41 is inserted into the hole 42. The collar 43 is then inserted into the bolt through hole in the columnar portion 41a of the rubber sheet 41. The bottom case receiving surface 40 of the lighting apparatus 37 is then applied to the lower end of the bottom case 4a. The bolt 44 is passed through the washer 44a, the mounting portion 39, and the collar 43 from a downward side and threaded and tightened into the threaded hole 45.

The board 46 mounted with the lighting body 47 is screwed to the housing 48 using the set screw 50. This is, however, not the only method; rather adhesive may be used, or both adhesive and the set screw may be used in combination.

The above-described procedures are concerned with the left front fork. The lighting apparatus 37 is mounted also on the right front fork similarly.

Figure 7:
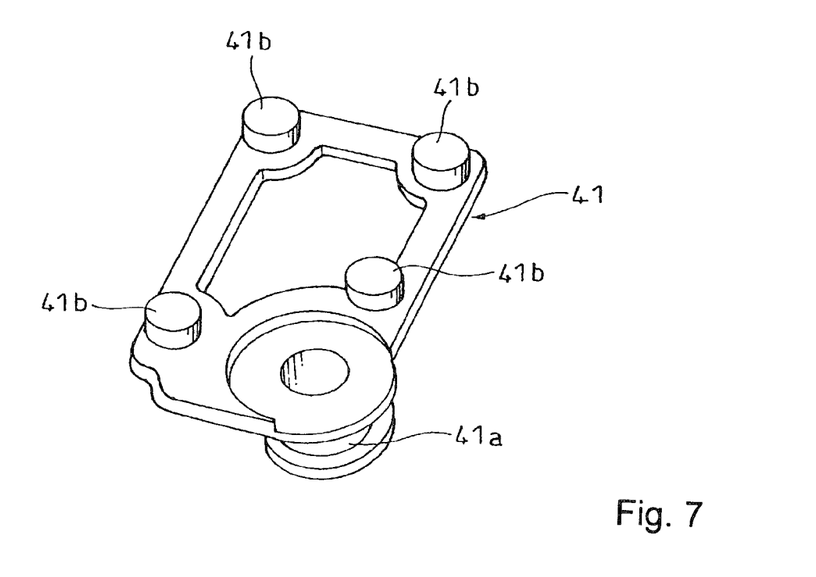
FIG. 7 is a perspective view showing a modified example of a rubber sheet.

In the embodiment of the present invention described above, the vibration isolation property is given by the rubber sheet 41 having a flat portion and the columnar portion disposed at one corner thereof. The vibration isolation member is not, however, limited to the rubber sheet of such a form. FIG. 7 is a perspective view showing a modified example of the rubber sheet 41. The rubber sheet 41 according to the modified example has protrusions 41b at four corners thereof. The protrusions 41b are formed to have a thick wall. The remaining thin-wall portion has a center part blanked to be formed generally into an annular shape that serves as a rib connecting the thick-wall protrusions 41b. With only the protrusions 41b at the four corners in abutment with the bottom case 4a, the bottom case 4a contacts stably the bottom case receiving surface 40. The configuration also contributes to a reduced amount of rubber used for molding the rubber sheet 41.

Figure 8:
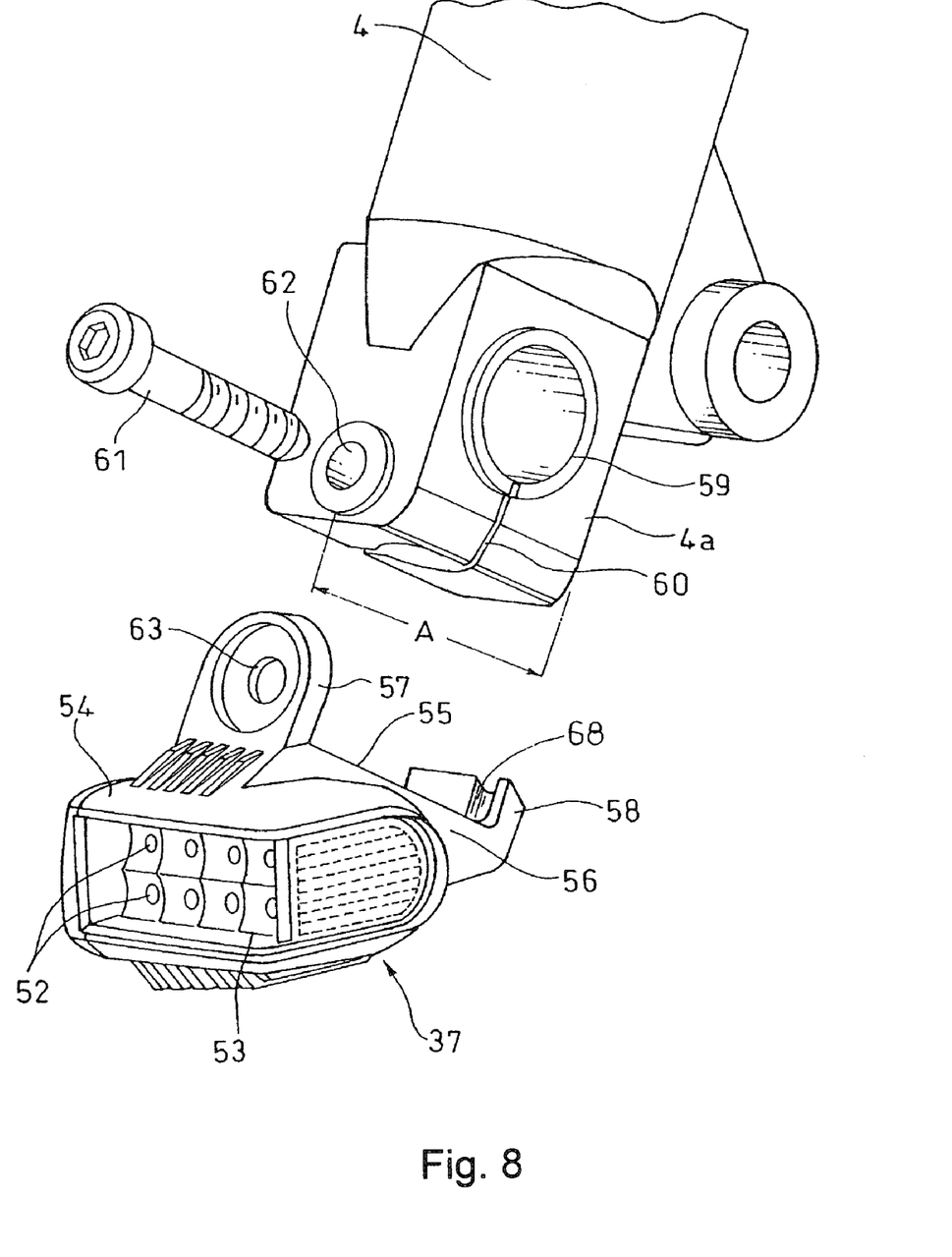
FIG. 8 is a perspective view showing a lighting apparatus disposed in a motorcycle according to another embodiment of the present invention.

FIG. 8 is a perspective view showing a lighting apparatus 37 and a front fork 4 according to another embodiment of the present invention. The lighting apparatus 37 has a lighting body 53 accommodated in a housing 54. The lighting body 53 includes a plurality of light emitting diodes 52 (only part of the plurality of light emitting diodes are marked with the reference numeral). The housing 54 has a mounting portion 56 formed on an upper portion thereof. The mounting portion 56 includes a bottom case receiving surface 55 having an inclined surface that matches the inclination of a lower end surface of a bottom case 4a. The mounting portion 56 has a bracket 57 that protrudes upwardly at a front portion of the mounting portion 56. Further, the mounting portion 56 has a guide 58 protruding upwardly at a rear portion of the mounting portion 56. Opposing surfaces of the bracket 57 and the guide 58 extend in parallel with each other. The opposing surfaces are spaced apart so as to be able to clamp therebetween the lower end of the bottom case 4a having a dimension A.

When the lighting apparatus 37 is applied to the lower end portion of the bottom case 4a from below, therefore, the lower end portion of the bottom case 4a is clamped between the opposing surfaces of the bracket 57 and the guide 58. The lighting apparatus 37 is thereby restricted in rotation relative to the bottom case 4a.

The bottom case 4a may include a slit 60 formed therein, extending from the lower end portion of the bottom case 4a up to a bearing 59 supporting a front wheel axle 7 (see FIG. 2). With the front wheel axle 7 inserted into the bearing 59, a pinch bolt 61 is inserted into a bolt hole 62 and tightened, so that the front wheel axle 7 is secured in the bearing 59. The bracket 57 of the lighting apparatus 37 has a hole 63 formed therein, through which the pinch bolt 61 can be passed. When the lighting apparatus 37 is applied to the bottom case 4a, the hole 63 is aligned with the bolt hole 62 in the bottom case 4a. Accordingly, the pinch bolt 61, which is commonly used for tightening the bearing 59 to thereby fix the axle, can also be used to secure the lighting apparatus 37 to the bottom case 4a. According to the second embodiment of the present invention, the bottom case 4a is adapted to be clamped by the bracket 57 and the guide 58. This arrangement allows a single bolt to fix the lighting apparatus 37 to the bottom case 4a. Further, the conventionally used pinch bolt can be used for this single bolt. This does not increase the number of parts used and the bottom case 4a does not require additional machining, either.

The guide 58 includes a wire guide 68 formed therein. The wire guide groove 68 is for withdrawing an electric wire (not shown) supplying the lighting body 53 with an electric power to an outside from the lighting apparatus 37.

Figure 9:
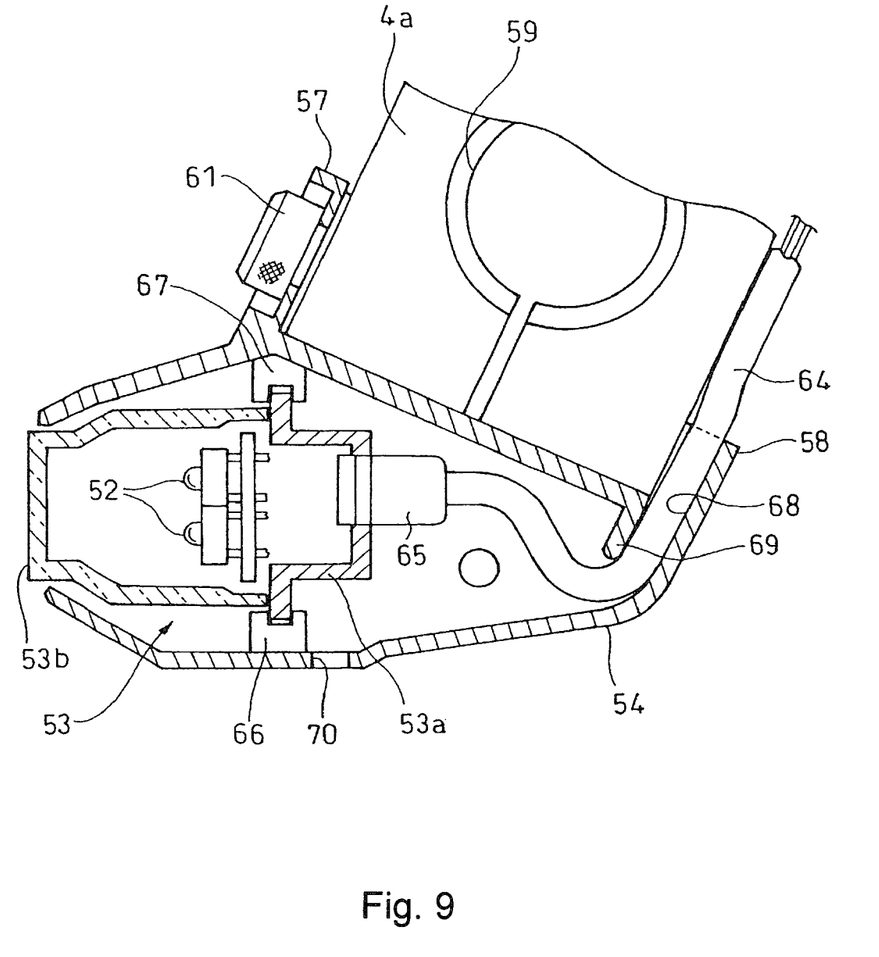
FIG. 9 is a cross-sectional view of the lighting apparatus shown in FIG. 8.

FIG. 9 is a cross-sectional view of the lighting apparatus 37 shown in FIG. 8. Referring to FIG. 9, the lighting body 53 disposed inside the housing 54 of the lighting apparatus 37 includes a board 53a, the light emitting diodes 52, a lens 53b, and a connector 65. The lens 53b is disposed at the front of the light emitting diodes 52 so as to cover the light emitting diodes 52. The connector 65 connects a wire 64, which supplies power to the light emitting diodes 52, to the light emitting diodes 52. The board 53a has upper and lower ends thereof supported by rails (or grooves) 66, 67 disposed on a bottom portion and an upper portion, respectively, of the housing 54, so that the lighting body 53 is positioned at a predetermined position inside the housing 54.

The guide 58 of the housing 54 has the wire guide groove 68 provided therein. The wire guide groove 68 forms a gap between the guide 58 and a wall surface of the bottom case 4a, through which the wire 64 can be passed. The wire 64 passing through the wire guide groove 68 is guided by an inner wall 69 of the housing 54 toward the bottom portion of the housing 54. The wire 64 is then bent upwardly and extended horizontally to be connected to the connector 65. The housing 54 has a drain hole 70 disposed in the bottom portion thereof.

The wire 64 is extended upwardly along the front fork 4, so that water can fall therealong into the lighting apparatus 37. The wire 64 is therefore slack at a downward portion thereof before being connected to the connector 65. The lighting apparatus 37 shown in FIG. 9 has this slack portion of the wire 64 inside the housing 54. This eliminates the possibility of the water sticking to the lighting body 53. Moreover, during operation, the arrangement effectively prevents flying gravel during running from hitting against the wire 64 or the housing 54 in contact with a road step from damaging the wire 64. The drain hole 70 made in the bottom of the housing 54 allows any water entering the housing 54 to be discharged therethrough.

Figure 10:
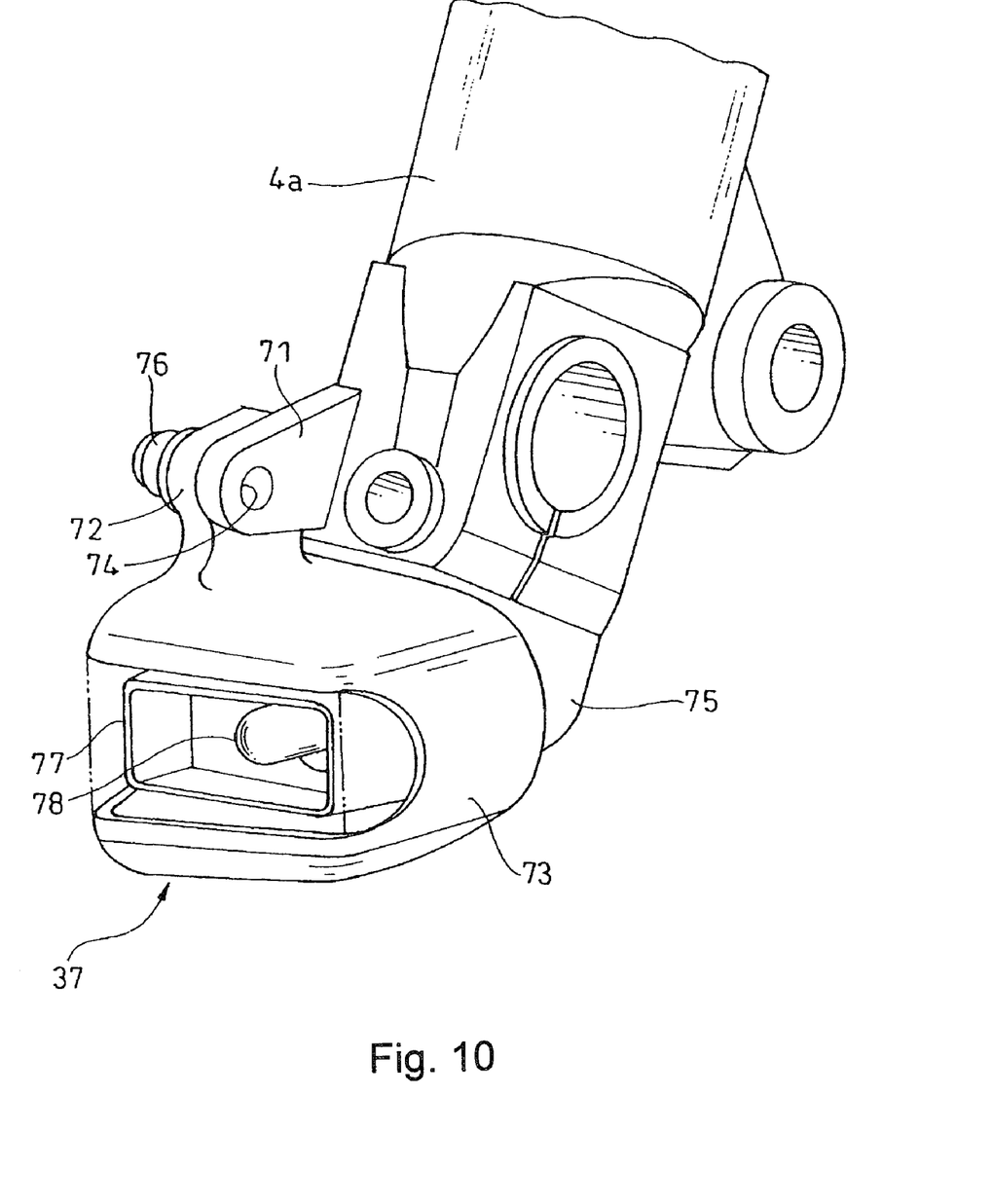
FIG. 10 is a perspective view showing a lighting apparatus disposed in a motorcycle according to another embodiment of the present invention.

FIG. 10 is a perspective view showing a lighting apparatus according to another embodiment of the present invention. In this embodiment of the present invention, a rib 71 is formed on a bottom case 4a and a bracket 72 to be connected to the rib 71 is disposed on an upper portion of a housing 73 of a lighting apparatus 37. The rib 71 of the bottom case 4a protrudes forwardly of the motorcycle and has a threaded hole 74 penetrating in the width direction of the vehicle body. The housing 73 of the lighting apparatus 37 includes a mounting portion 75 formed thereon. The mounting portion 75 has a generally flat upper surface that abuts on a lower end surface of the bottom case 4a. The bracket 72 includes a bolt through hole (not shown) formed therein. The bolt through hole is aligned with the threaded hole 74 in the rib 71 with the upper surface of the mounting portion 75 in abutment with the lower end surface of the bottom case 4a. A bolt 76 is passed through the bolt through hole and threaded into the threaded hole 74 in the rib 71. This firmly secures the lighting apparatus 37 to the bottom case 4a.

In the lighting apparatus 37 according to this embodiment, a lighting body 77 has a single light bulb 78, instead of the plurality of light emitting diodes. Typically, the light bulb 78 is an incandescent bulb, a halogen bulb, or the like.

Preferably, the lighting apparatus 37 of this embodiment is disposed on a line extended from an axis of the front fork 4 that is formed into a tube. Further preferably, the lighting apparatus 37 has a size that can be fitted in a range which includes ends of an axle protruding in the vehicle width direction from the front fork 4 and the front fork 4.

Figure 11:
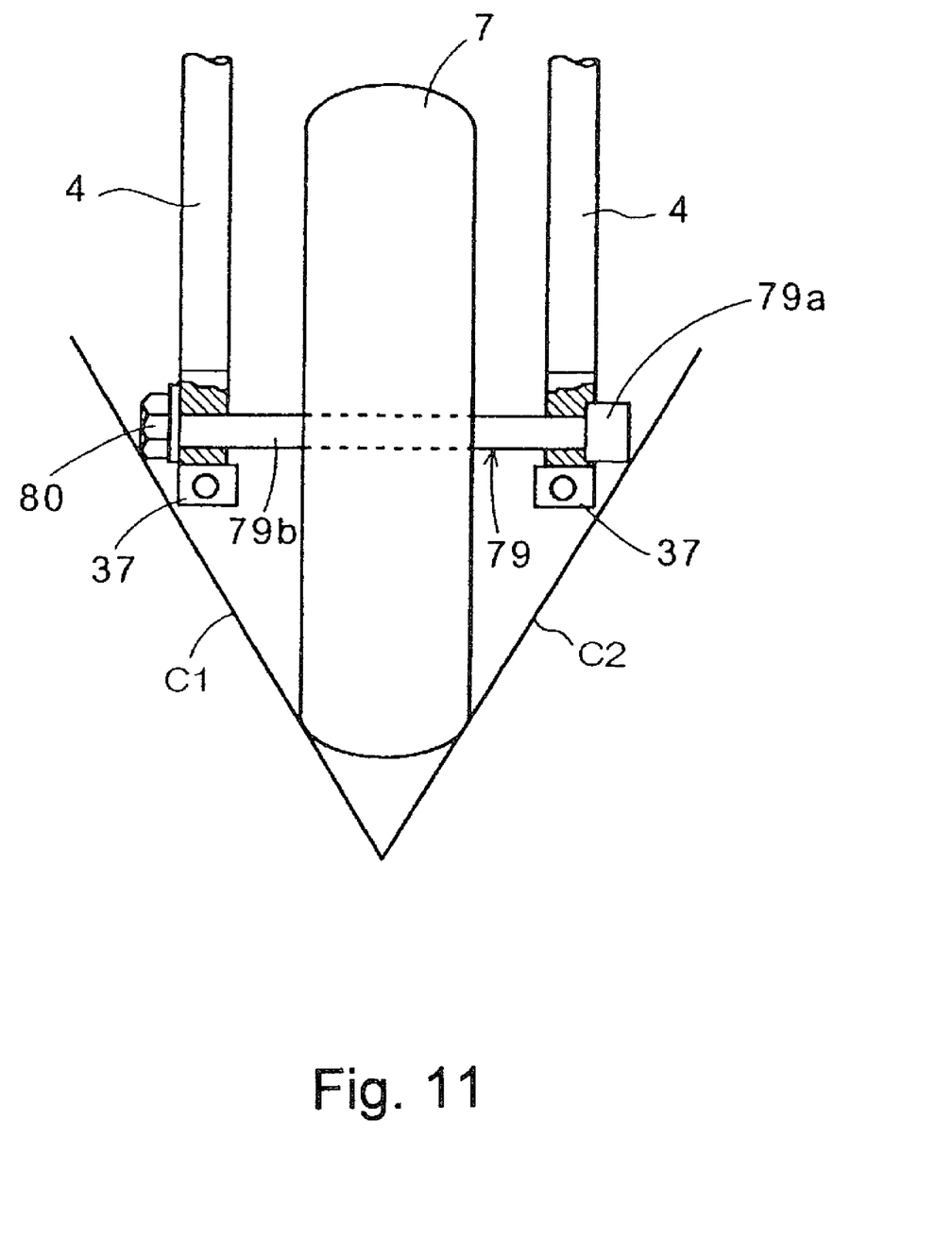
FIG. 11 is a front view of a principal part of the motorcycle, showing positions at which the lighting apparatuses may be disposed.

FIG. 11 is a front view of the motorcycle, showing the lighting apparatuses 37 fitted inside a range of straight lines that connect the ends of the axle and the front wheel. Referring to FIG. 11, an axle 79 includes a head 79a having a large diameter on a proximal end thereof. The axle 79 further includes a small-diameter portion 79b that continues from the head 79a. The small-diameter portion 79b has a length extending from the front fork 4 on a proximal end via a front wheel 7 to the front fork 4 on a distal end. Internal threads are cut on a leading end of the small-diameter portion 79b of the axle 79, into which an axle bolt 80 is screwed. Specifically, the axle bolt 80 and the head 79a of the axle 79 protrude in the vehicle width direction from the front forks 4, 4.

Dimensions and positions are selected for the lighting apparatuses 37 such that the lighting apparatuses 37 are disposed inside of a tangent C1 between the front wheel 7 and the axle bolt 80 and of a tangent C2 between the front wheel 7 and the head 79a of the axle 79, specifically, an inboard side in the width direction of the motorcycle. This arrangement and dimensions help the axle 79 and axle bolt 80, which are sturdier than the lighting apparatuses 37, protect the lighting apparatuses 37 from an external force and minimize effect from flying gravel and splashing water.

In FIG. 11, a collar, disc brake, and other parts disposed between the front wheel 7 and each of the front forks 4, 4 are omitted, as these parts are not essential to the embodiments of the present invention.

In the foregoing description, the present invention has been described with reference to specific embodiments that are considered to be the best mode for carrying out the invention. Various modifications and changes can nonetheless be made without departing from the scope of the present invention as set forth in the claims. For example, a reflector may be used for the lighting body described in each of the embodiments, instead of the light bulb or the light emitting diode. The reflector may be formed as an array of a plurality of corner cubes.

Wiring of the wire and the drain hole provided for prevention of the lighting body from being splashed with water that can enter the lighting apparatus 37 are not limited only to the lighting apparatus according to a specific embodiment of the present invention. The similar arrangements can also be implemented in the lighting apparatuses according to the any of the above-described embodiments of the present invention.

Although specific embodiments of the present invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A motorcycle having a lighting apparatus, the lighting apparatus comprising:
a lighting body; and
a housing accommodating the lighting body, the housing comprising:
a housing main body having a front opening disposed on a side of a radiation direction of the lighting body and a side opening disposed on an inboard side in a width direction of the motorcycle; and
a lid covering the side opening, the side opening designed to allow the lighting body to pass through, wherein
the lighting apparatus is provided on a lower end of a fork supporting a front wheel of the motorcycle via a bearing portion.

2. The motorcycle according to claim 1, wherein the housing further comprises:
a wire guide formed by a gap between the lower end of the front fork and the housing, the wire guide directing an electric wire for the lighting body into the housing from an upward direction;
a wall member on an inside surface of the housing, the wall member guiding the electric wire in a downward direction with respect to the lighting body; and
a drain hole formed in a bottom side of the housing.

3. The motorcycle according to claim 1, wherein
the lighting body is attached to a board; and
an inside surface of the housing includes rails disposed on an upper wall portion and a lower wall portion thereof, into which an upper end and a lower end of the board are inserted so as to position the lighting body in a longitudinal direction of the lighting apparatus.

4. The motorcycle according to claim 2, wherein
the lighting body is attached to a board; and
an inside surface of the housing includes rails disposed on an upper wall portion and a lower wall portion thereof, into which an upper end and a lower end of the board are inserted so as to position the lighting body in a longitudinal direction of the lighting apparatus.

5. The motorcycle according to claim 3, wherein
the board includes a bracket provided in a standing condition; and
the bracket is attached to the housing.

6. A motorcycle having a lighting apparatus, the lighting apparatus comprising:
a lighting body; and
a housing accommodating the lighting body, the housing comprising:
a housing main body having a front opening disposed on a side of a radiation direction of the lighting body and a side opening disposed on an inboard side of the main body in a width direction of the motorcycle that is adjacent to the front opening;
a lid covering the side opening, the side opening designed to allow the lighting body to pass through;
a wire guide formed by a gap between the lower end of the front fork and the housing, the wire guide directing an electric wire for the lighting body into the housing from an upward direction;
a wall member on an inside surface of the housing, the wall member guiding the electric wire in a downward direction with respect to the lighting body; and
a drain hole formed in a bottom side of the housing, wherein
the lighting apparatus is provided on a lower end of a fork supporting a front wheel of the motorcycle via a bearing portion.

* * * * *